(12) United States Patent
Yau et al.

(10) Patent No.: US 6,866,379 B2
(45) Date of Patent: Mar. 15, 2005

(54) PREFERRED MATERIALS FOR PIGMENTED INK JET INK

(75) Inventors: Hwei-Ling Yau, Rochester, NY (US); Wendy S. Krzemien, Hilton, NY (US); Elmer C. Flood, Canandaigua, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/284,957

(22) Filed: Oct. 31, 2002

(65) Prior Publication Data

US 2004/0085418 A1 May 6, 2004

(51) Int. Cl.⁷ .................................................. B41J 2/01
(52) U.S. Cl. ........................ 347/100; 347/101; 523/160
(58) Field of Search ................................. 347/100, 101, 347/96, 95, 105; 523/160; 106/31.13, 31.6, 31.27; 428/195, 32.1, 32.32

(56) References Cited

U.S. PATENT DOCUMENTS

| | | | | |
|---|---|---|---|---|
| 4,460,637 A | * | 7/1984 | Miyamoto et al. | 347/105 |
| 4,597,794 A | | 7/1986 | Ohta et al. | |
| 5,106,417 A | | 4/1992 | Hauser et al. | |
| 5,172,133 A | | 12/1992 | Suga et al. | |
| 5,223,026 A | * | 6/1993 | Schwarz, Jr. | 347/100 |
| 5,696,182 A | * | 12/1997 | Kashiwazaki et al. | 106/31.27 |
| 5,716,436 A | * | 2/1998 | Sorriero et al. | 347/100 |
| 5,883,157 A | | 3/1999 | Yamashita et al. | |
| 5,913,971 A | | 6/1999 | Fujimatsu et al. | |
| 5,952,082 A | * | 9/1999 | Normington et al. | 428/195 |
| 5,959,035 A | * | 9/1999 | Guo | 525/123 |
| 6,031,019 A | * | 2/2000 | Tsutsumi et al. | 523/160 |
| 6,031,022 A | * | 2/2000 | Martin et al. | 523/161 |
| 6,136,890 A | * | 10/2000 | Carlson et al. | 523/160 |
| 6,245,832 B1 | | 6/2001 | Suzuki et al. | |
| 6,248,163 B1 | * | 6/2001 | Martin | 106/31.86 |
| 6,460,988 B1 | * | 10/2002 | Mafune et al. | 347/100 |
| 6,475,602 B1 | | 11/2002 | Kapusniak et al. | |
| 6,492,006 B1 | | 12/2002 | Kapusniak et al. | |
| 6,565,202 B2 | * | 5/2003 | Rose et al. | 347/100 |

FOREIGN PATENT DOCUMENTS

| | | |
|---|---|---|
| EP | 1167466 | 2/2002 |
| EP | 1193301 | 3/2002 |
| WO | WO 95/16002 | 6/1995 |

OTHER PUBLICATIONS

U.S. Appl. No. 09/887,183, filed Jun. 21, 2001, entitled "Ink Jet Printing Method," by David Erdtmann et al.

* cited by examiner

*Primary Examiner*—Manish Shah
(74) *Attorney, Agent, or Firm*—Doreen M. Wells; J. Jeffrey Hawley

(57) ABSTRACT

An ink jet ink composition including from 40.0 to 99.0% by weight of water; from 0.1 to 20.0% by weight of a pigment dispersed with an oleoyl methyl taurine salt dispersant from 0 to 70.0% by weight of a water miscible co-solvent; and from 0.1 to 20.0% by weight of a water-reducible addition polymer; wherein the weight average molecular weight of the polymer is from 2,000 to 100,000; the acid number is from 50 to 400; and the acid group on the polymer is neutralized by an alkaline metal hydroxide such as lithium hydroxide, sodium hydroxide potassium hydroxide, or a mixture thereof; and wherein all weight percentages are based on the total weight of the ink composition. An ink jet printing method is also disclosed.

30 Claims, No Drawings

PREFERRED MATERIALS FOR PIGMENTED INK JET INK

FIELD OF THE INVENTION

This invention relates to pigmented inks for ink jet printing employing water-reducible addition polymers of preferred composition.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging.

In ink jet recording processes, it is necessary that the inks being used meet various performance requirements. Such performance requirements are generally more stringent than those for other liquid ink applications, such as for writing instruments (e.g., a fountain pen, felt pen, etc.). In particular, the following conditions are generally required for inks utilized in ink jet printing processes:

(1) The ink should possess physical properties such as viscosity, surface tension, and electric conductivity matching the discharging conditions of the printing apparatus, such as the driving voltage and driving frequency of a piezoelectric electric oscillator, the form and material of printhead orifices, the diameter of orifices, etc;
(2) The ink should be capable of being stored for a long period of time without causing clogging of printhead orifices during use;
(3) The ink should be quickly fixable onto recording media, such as paper, film, etc., such that the outlines of the resulting ink dots are smooth and there is minimal blotting of the dotted ink;
(4) The printed image should be of high quality, such as having a clear color tone and high density, have high gloss and high color gamut;
(5) The printed image should exhibit excellent waterfastness (water resistance) and lightfastness (light resistance);
(6) The printed (ink) images should have good adhesion to the surface of image receiving elements and should be durable and highly resistant to physical and mechanical scratches or damages
(7) The ink should not chemically attack, corrode or erode surrounding materials such as the ink storage container, printhead components, orifices, etc;
(8) The ink should not have an unpleasant odor and should not be toxic or inflammable; and
(9) The ink should exhibit low foaming and high pH stability characteristics.

The inks used in various ink jet printers can be classified as either dye-based or pigment-based. A dye is a colorant that is molecularly dispersed or solvated by a carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dye-based ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers that serve to keep the pigment particles from agglomerating and/or settling out.

Pigment-based inks suffer from a different set of deficiencies than dye-based inks. One deficiency is that pigment-based inks interact differently with specially coated papers and films, such as transparent films used for overhead projection and glossy papers and opaque white films used for high quality graphics and pictorial output. In particular, it has been observed that pigment-based inks produce imaged areas that are entirely on the surface of coated papers and films, which result in images that have poor dry and wet adhesion properties and can be easily smudged. In recent years, ink jet receivers have been developed to have both high gloss and high porosity to give fast drying capabilities. However, scratch mark smudges are more visible on high gloss receivers. In order to provide a pigmented ink composition that can be used in printing images on an ink jet porous glossy, receiving element having acceptable durability and smudging resistance, polymers are often used as additive in pigmented inks.

U.S. Pat. No. 6,533,408 discloses classes of water-dispersible polymers used in pigmented ink for both durability and ozone stability improvement, including aqueous polyurethane dispersion. However, not all polymers can be jetted from inkjet printhead easily and reliably.

Addition type polymers have been commonly used in pigment-based inks, as an additive to pigment dispersions to improve print durability. The polymer is usually not ionically or physically associated with pigment dispersion in ink till printed on an ink jet receiver. U.S. Pat. No. 4,597,794 teaches the use of a polymer in pigment based inkjet ink, the polymer has both ethylenically unsaturated carboxylic acid substituent as a hydrophilic portion and an aromatic ring substituent as a hydrophobic portion, and wherein the said hydrophilic portion constitutes from 2 to 40 weight percent of said polymer, and the molecular weight of the polymer prefers to be 1,000 to 100,000. U.S. Pat. No. 5,106,417 claims the use of polyacrylic resins containing carboxylic acid group in pigmented ink to improve image quality and water resistance. Preferred acrylic resins consist of ethyl acrylate, methyl methacrylate and acrylic or methacrylic acid, having acid number of 50–300, and weight average molecular weight (Mw) of 30,000 to 70,000. U.S. Pat. No. 5,172,133 teaches the use acrylic acid-ethyl acrylate-styrene copolymers in pigmented ink jet ink to improve storage stability and clogging resistance. U.S. Pat. No. 5,883,157 teaches the use of styrene-maleic anhydride copolymer in ink jet ink to improve image quality and dry time on plain paper, and resistance to printhead clogging. The mean molecular weight of styrene-maleic anhydride copolymer is from 1000 to 10,000. U.S. Pat. No. 5,913,971 claims the use of a terpolymer obtained from acrylic acid, styrene and α-methyl styrene and has an average molecular weight of 2,000 to 8,000 and an acid number of 90 to 130 in pigment based ink jet ink to improve print durability while maintaining good storage stability. WO 9,516,002 also teaches the use of styrene-acrylic acid copolymer ammonium salt in black ink to improve jettability from an inkjet printhead and high print density.

A general phenomenon has been noticed by the inventors that as acid number of the polymer is increased and molecular weight of the polymer is decreased in order to get satisfactory and uniform jettability from an ink jet printhead, the print durability is compromised, especially if the printed image has been wet with aqueous fluids. The deficiency is due to the fact that polymer has increased water solubility. However, when a polymer having increased molecular weight and decreased acid number is used, image defects due to lack of reliable jettability is noticed, resulting in density decrease in printing direction across the page.

Due to the low cost of materials made from addition polymerization, it is desirable to find an optimum polymer composition to be used in an ink jet ink so that printed images on an ink jet receiving element have improved physical durability such as scratch and smudging resistance while maintaining reliable jettability from ink jet printheads to produce quality images at all time.

SUMMARY OF THE INVENTION

These and other objects are achieved in accordance with this invention which relates to an ink jet ink composition comprising from 40.0 to 99.0% by weight of water; from 0.1 to 20.0%, usually 0.1 to 20.0%, and preferably 0.2 to 15.0% by weight of a pigment; from 0 to 70.0%, usually from 1.0 to 50%, and preferably 5.0 to 40.0% by weight of one or more water miscible co-solvent; and from 0.1 to 20.0%, preferably from 0.2 to 15.0% by weight of a water-reducible addition polymer; wherein the addition polymer may comprise the monomers of allyl compounds, ally esters, vinyl ethers, vinyl esters, vinyl heterocyclic compounds, styrene or a styrene derivative, olefins and halogenated olefins, itconic acid and esters, crotonic acid and esters, unsaturated nitrites, acrylic acid or methacrylic acid and esters, vinyl alcohols, acrylamides and methacrylamides, vinyl ketones, or multifunctional monomers; and wherein the weight average molecular weight of the polymer is from 2,000 to 100,000, preferably 4,000 to 40,000; the acid number is from 50 to 400, preferably 100 to 300; and the acid group on polymer is neutralized by alkaline metal hydroxide, such as potassium hydroxide, sodium hydroxide or lithium hydroxide.

DETAILED DESCRIPTION OF THE INVENTION

The support for the ink-receiving element employed in the invention can be paper or resin-coated paper, plastics such as a polyolefin type resin or a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. or comprising an open pore structure such as those made from polyolefins or polyesters. The thickness of the support employed in the invention can be, for example, from about 12 to about 500 $\mu$m, preferably from about 75 to about 300 $\mu$m.

In a preferred embodiment of the invention, the continuous, coextensive, porous ink-receiving layer contains organic or inorganic particles. Examples of organic particles which may be used include core/shell particles such as those disclosed in U.S. Pat. No. 6,492,006 and homogeneous particles such as those disclosed in U.S. Pat. No. 6,475,602. the disclosures of which are hereby incorporated by reference. Examples of organic particles that may be used include acrylic resins, styrenic resins, cellulose derivatives, polyvinyl resins, ethylene-allyl copolymers and polycondensation polymers such as polyesters. Examples of inorganic particles that may be used in the invention include silica, alumina, titanium dioxide, clay, calcium carbonate, barium sulfate, or zinc oxide.

In a preferred embodiment of the invention, the porous ink-receiving layer comprises from about 20% to about 100% of particles and from about 0% to about 80% of a polymeric binder, preferably from about 80% to about 95% of particles and from about 20% to about 5% of a polymeric binder. The polymeric binder may be a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly (acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Preferably, the hydrophilic polymer is poly(vinyl alcohol), hydroxypropyl cellulose, hydroxypropyl methyl cellulose, a poly(alkylene oxide), poly(vinyl pyrrolidinone), poly(vinyl acetate) or copolymers thereof or gelatin.

In order to impart mechanical durability to an ink jet recording element, crosslinkers which act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, vinyl sulfones, pyridinium, pyridylium dication ether, methoxyalkyl melamines, triazines, dioxane derivatives, chrom alum, zirconium sulfate and the like may be used. Preferably, the crosslinker is an aldehyde, an acetal or a ketal, such as 2,3-dihydroxy-1,4-dioxane.

As used herein, a porous ink jet receiving layer is one that is usually composed of inorganic or organic particles bonded together by a binder. The amount of particles in this type of coating is often far above the critical particle volume concentration, which results in high porosity in the coating. During the ink jet printing process, ink droplets are rapidly absorbed into the coating through capillary action and the image is dry-to-touch right after it comes out of the printer. Therefore, porous coatings allow a fast "drying" of the ink and produce a smear-resistant image.

The porous ink-receiving layer can also comprise an open-pore polyolefin, an open-pore polyester or an open pore membrane. An open pore membrane can be formed in accordance with the known technique of phase inversion. Examples of porous ink-receiving layer comprising an open-pore membrane are disclosed in U.S. Pat. Nos. 6,497,941 and 6,503,607.

Pigments which may be used in the invention include organic and inorganic pigments, alone or in combination, such as those as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment employed is C.I. Pigment Blue 15:3, C.I. Pigment Red 122, C.I. Pigment Yellow 155, C.I. Pigment Yellow 74, bis (phthalocyanylalumino)tetraphenyldisiloxane or C.I. Pigment Black 7.

The aqueous carrier medium for the ink composition employed in the invention is water or a mixture of water and at least one water miscible co-solvent. Selection of a suitable mixture depends on the requirements of the specific application, such as desired surface tension and viscosity, the selected pigment, drying time of the pigmented ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

The amount of water-miscible co-solvent is in the range of 0 to 70%, usually 1.0 to 50.0 weight %, and preferably approximately 5 to 40 weight %, based on the total weight of the ink.

In general it is desirable to make a pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to the desired concentration. By dilution, the ink is adjusted to the desired viscosity, color, hue, saturation density, and print area coverage for the particular application. The method for the preparation of the mill grind is disclosed in U.S. Pat. Nos. 5,679,138; 5,670,139 and 6,152,999, the disclosures of which are hereby incorporated by reference. In a preferred embodiment of the invention, a dispersant is also added to the ink jet ink composition and is used to break down the pigment to sub-micron size during the milling process and keeps the colloidal dispersion stable and free from flocculation for a long period of time.

In the case of organic pigments, the ink may contain from 0.1 to 20.0%, preferably from 0.2 to 15.0% pigment by weight of the total ink composition for most ink jet printing applications. If an inorganic pigment is selected, the ink will tend to contain higher weight percentages of pigment than with comparable inks employing organic pigments, and may be as high as approximately 75% in some cases, since inorganic pigments generally have higher specific gravities than organic pigments.

The polymers used in this invention are commonly known as water-reducible resins, which are polymers having hydrophilic groups in some monomers. Polymer is not water soluble till neutralized by base. Acid number is a common term used to indicate the amount of acid group in a polymer, it is defined as mg of KOH required to neutralize 1 g of resin slids. The monomers for the addition polymer of this invention can be selected from methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, styrene, α-methyl styrene, t-butyl styrene, vinyl toluene, butadiene, isoprene, N,N-dimethyl acrylamide, acrylic acid, methacrylic acid, chloromethacrylic acid, maleic acid and derivatives thereof. Examples of suitable monomers include allyl compounds such as allyl esters (e.g., allyl acetate, allyl caproate, etc.); vinyl ethers (e.g., methyl vinyl ether, butyl vinyl ether, methoxyethyl vinyl ether, ethoxyethyl vinyl ether, chloroethyl vinyl ether, 1-methyl-2,2-dimethylpropyl vinyl ether, hydroxyethyl vinyl ether, diethylene glycol vinyl ether, dimethylaminoethyl vinyl ether, butylaminoethyl vinyl ether, benzyl vinyl ether, tetrahydrofurfuryl vinyl ether, etc.); vinyl esters (such as vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, etc.); vinyl heterocyclic compounds (such as N-vinyl oxazolidone, N-vinylimidazole, N-vinylpyrrolidone, N-vinylcarbazole, vinyl thiophene, N-vinylethyl acetamide, etc.); styrenes (e.g, styrene, divinylbenzene, methylstyrene, dimethylstyrene, ethylstyrene, isopropylstyrene, sodium styrenesulfonate, potassium styrenesulfinate, butylstyrene, hexylstyrene, cyclohexylstyrene, benzylstyrene, chloromethylstyrene, trifluoromethylstyrene, acetoxymethylstyrene, acetoxystyrene, vinylphenol, (t-butoxycarbonyloxy) styrene, methoxystyrene, 4-methoxy-3-methylstyrene, dimethoxystyrene, chlorostyrene, dichlorostyrene, trichlorostyrene, bromostyrene, iodostyrene, fluorostyrene, methyl vinylbenzoate ester, vinylbenzoic acid, etc.); crotonic acids (such as crotonic acid, crotonic acid amide, crotonate esters (e.g., butyl crotonate, etc.)); vinyl ketones (e.g., methyl vinyl ketone, etc ); olefins (e.g., dicyclopentadiene, ethylene, propylene, 1-butene, 5,5-dimethyl-1-octene, etc.); itaconic acids and esters (e.g., itaconic acid, methyl itaconate, etc.), other acids such as sorbic acid, cinnamic acid, methyl sorbate, citraconic acid, chloroacrylic acid mesaconic acid, maleic acid, fumaric acid, and ethacrylic acid; halogenated olefins (e.g., vinyl chloride, vinylidene chloride, etc.); unsaturated nitriles (e.g., acrylonitrile, etc.); acrylic or methacrylic acids and esters (such as acrylic acid, methyl acrylate, methacrylic acid, methyl methacrylate, ethyl acrylate, butyl acrylate, butyl methacrylate, 2-hydroxyethyl methacrylate, 2-acetoacetoxyethyl methacrylate, sodium-2-sulfoethyl acrylate, 2aminoethylmethacrylate hydrochloride, glycidyl methacrylate, ethylene glycol dimethacrylate, etc.); and acrylamides and methacrylamides (such as acrylamide, methacrylamide, N-methylacrylamide, N,N-dimethylacrylamide, N-isopropylacrylamide, N-s-butylacrylamide, N-t-butylacrylamide, N-cyclohexylacrylamide, N-(3-aminopropyl)methacrylamide hydrochloride, N-(3-dimethylaminopropyl)methacrylamide hydrochloride, N,N-dipropylacrylamide, N-(1,1-dimethyl-3-oxobutyl)acrylamide, N-(1,1,2-trimethylpropyl)acrylamide, N-(1,1,3,3-tetramethylbutyl)acrylamide, N-(1-phthalamidomethyl)acrylamide, sodium N-(1,1-dimethyl-2-sulfoethyl)acrylamide, N-butylacrylamide, N-(1,1-dimethyl-3-oxobutyl)acrylamide, N-(2-carboxyethyl)acrylamide, 3-acrylamido-3-methylbutanoic acid, methylene bisacrylamide, etc.). The polymer of this invention can be prepared by emulsion polymerization, solution polymerization or bulk polymerization technique well known in the art. Furthermore, the addition polymer of this invention has a weight average molecular weight of 2,000 to 100,000, preferably 4,000 to 40,000; an acid number of 50 to 400, preferably 100 to 300; and the acid group, preferably 75% to 100%, is neutralized by alkaline metal hydroxide, such as potassium hydroxide, sodium hydroxide or lithium hydroxide.

The addition polymer used in the invention is present in the ink jet ink generally from about 0.1% to about 20% by weight, preferably from about 0.2% to about 15% by weight based on the total weight of the ink.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dynes/cm to about 60 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

A humectant is added to the composition employed in the process of the invention to help prevent the ink from drying out or crusting in the orifices of the ink jet printhead. Polyhydric alcohol humectants useful in the composition employed in the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. The humectant may be employed in a concentration of from about 10 to about 50% by weight. In a preferred embodiment, diethylene glycol or a mixture of glycerol and diethylene glycol is employed at a concentration of between 10 and 20% by weight.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10% by weight) may also be added to the ink composition employed in the process of the invention to help the ink penetrate the receiving substrate, especially when the substrate is a highly sized paper. A preferred penetrant for the inks employed in the present invention is n-propanol at a final concentration of 1–6% by weight.

A biocide (0.01–1.0% by weight) may also be added to the ink composition employed in the process of the invention to prevent unwanted microbial growth which may occur in the ink over time. A preferred biocide for the inks employed in the present invention is Proxel® GXL (Zeneca Colours Co.) at a concentration of 0.05–0.5% by weight. Additional additives that may optionally be present in ink jet inks include thickeners, conductivity enhancing agents, anti-kogation agents, drying agents, and defoamers.

Ink jet inks made using water-dispersible polymers employed in this invention are employed in ink jet printing wherein liquid ink drops are applied in a controlled fashion to an ink receiving substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receiving layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLES

Example 1

Magenta pigment dispersion was prepared as described below.

Magenta Pigment Dispersion 1 (MD-1)

| | |
|---|---|
| Polymeric beads, mean diameter of 50 micron (milling media) | 325 g |
| Quinacridone magenta (Pigment Red 122) from Sun Chemical Co. | 30 g |
| Oleoyl methyl taurine, (OMT) potassium salt | 9 g |
| Deionized water | 210.8 g |
| Proxel GXL ® (biocide from Zeneca) | 0.2 g |

The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 µm KIMAX® Buchner Funnel obtained from VWR Scientific Products.

Preparation of Addition Polymer Solutions

P1

Jonrez IJ-4655, a styrene-acrylic resin material was obtained from Westvaco in un-neutralized solid form. The weight average molecular weight is 5,600, glass transition temperature is 80° C. and acid number is 230, quoted from Westvaco.

P1-KOH 40 grams of P-1, 87.4 g of 10% KOH solution, and 32.6 g of water were mixed in a sealed glass container. The mixture was stirred in 60° C. for 16 hours to obtain a clear solution of 25% P-1 in which 95% of acid was neutralized with KOH.

P1-NaOH 40 grams of P-1, 62.4 g of 10% NaOH solution, and 57.6 g of water were mixed in a sealed glass container. The mixture was stirred in 60° C. for 16 hours to obtain a clear solution of 25% P-1 in which 95% of acid was neutralized with NaOH.

P1-LiOH 40 grams of P-1, 6.56 g of LiOH monohydrate, and 113.44 g of water were mixed in a sealed glass container. The mixture was stirred in 60° C. for 16 hours to obtain a clear solution of 25% P-1 in which 95% of acid was neutralized with LiOH.

P1-DMEA 40 grams of P-1, 6.56 g of LiOH monohydrate, and 113.44 g of water were mixed in a sealed glass container. The mixture was stirred in 60° C. for 16 hours to obtain a clear solution of 25% P-1 in which 95% of acid was neutralized with $NH_4OH$.

P1-DMEA 40 grams of P-1, 13.90 g of N,N-dimethylethanol amine, and 106.10 g of water were mixed in a sealed glass container. The mixture was stirred in 60° C. for 16 hours to obtain a clear solution of 25% P-1 in which 95% of acid was neutralized with N,N-dimethylethanol amine.

P1-TEA 40 grams of P-1, 16.00 g of triethylamine, and 104.00 g of water were mixed in a sealed glass container. The mixture was stirred in 60° C. for 16 hours to obtain a clear solution of 25% P-1 in which 95% of acid was neutralized with triethylamine.

P1-TELA 40 grams of P-1, 23.30 g of triethanolamine, and 96.80 g of water were mixed in a sealed glass container. The mixture was stirred in 60° C. for 16 hours to obtain a clear solution of 25% P-1 in which 95% of acid was neutralized with triethanolamine.

P1-DELA 40 grams of P-1, 16.40 g of diethanolamine, and 103.60 g of water were mixed in a sealed glass container. The mixture was stirred in 60° C. for 16 hours to obtain a clear solution of 25% P-1 in which 95% of acid was neutralized with diethanolamine.

P1-EM 40 grams of P-1, 17.90 g of 4-ethylmorpholine, and 102.10 g of water were mixed in a sealed glass container. The mixture was stirred in 60° C. for 16 hours to obtain a clear solution of 25% P-1 in which 95% of acid was neutralized with 4-ethylmorpholine.

P2

P-2 was TruDot IJ-4680 available from Westvaco Corporation, supplied in solution form of 26% solids. It is a styrene-acrylic polymer having acid number of 170 and Tg of 50C. Organic amine was used as the base to solubilize the polymer.

P2-KOH

P2-KOH was prepared by mixing 1000 grams of P2 solution (TruDot IJ-4680, available from Westvaco Corporation) with 400 gram of 10% KOH solution, and then followed by heating to 80C under vacuum to remove volatile organic amine. The final solution was 25.84% in solids. The amine counter ion for the acid on polymer was expected to be replaced by potassium ion after the reaction.

Ink Preparation

An ink formulation employed in this invention was prepared by mixing all ingredients with mild stirring at room temperature. In addition to magenta pigment PR122 from MD-1 at 2.2% and addition polymer at 2.0%, the ink also contained glycerol at 6%, diethylene glycol at 20%, Dowanol EB® at 2.5%, and Surfynol 465® at 0.2%, all by weight.

The pigment and addition polymers used in the inks employed in this invention and the comparison inks are given in the following Table 1:

TABLE 2

| Ink | Polymer Dispersion |
| --- | --- |
| C-1 (Control) | None |
| C-2 (Control) | P1-DMEA |
| C-3 (Control) | P1-TEA |
| C-4 (Control) | P1-TELA |
| C-5 (Control) | P1-DELA |
| C-6 (Control) | P1-EM |
| C-7 (Control) | P1-NH4OH |
| I-1 | P1-KOH |
| I-2 | P1-NaOH |
| I-3 | P1-LiOH |
| C-8 (Control) | P2 |
| I-4 | P2-KOH |

Ink Jet Recording Elements

Epson Premium Glossy Photo Paper® SO41286, (Epson Corporation), which is a porous glossy receiver, was used for ink jet printing.

Ink Jet Printing

A series of inks having the ingredients shown in Table 1 were added to empty Hewlett-Packard HP 692C ink cartridges and loaded into an HP 692C printer to print on Epson Ink jet receiver. A digital image of 4 inches wide by 0.75 inches long area was printed across the page at 100% ink coverage.

Jetting Non-Uniformity

Jetting non-uniformity is defined as the density difference between the left side and right side of the image printed above. Status A reflectance densities as measured by an X-Rite® densitometer on the two ends of imaged area 4 inches apart were recorded. The less difference in density between the two sides of the printed image indicates the better jetting uniformity. It is most desirable to get identical density (or zero density difference) from both sides of the image.

Wet and Dry Rub Resistance

The ink jet printed sample with 100% ink coverage prepared above was subjected to wet and dry rub resistance tests. A wet rub resistance test was carried out by placing an approximately 2.54 cm diameter water droplet on the ink-coated sample surface for 2 minutes, after which the excess water was gently wiped off using a paper towel. The above treated area was then rubbed with a dry paper towel for 8 passes under a pressure of 200 grams over a 3.5 cm diameter area. Status A reflectance density as measured by an X-Rite® densitometer on the tested area was recorded and compared to the optical density before testing. Wet rub resistance is defined as the percentage of optical density (OD) retained after testing. 100% density retained indicates no damage or loss or optical density on the imaged area.

A dry rub resistance test was carried out by rubbing the samples with a dry paper towel for 8 passes under a pressure of 200 grams over a 3.5 cm diameter area. Status A reflectance density as measured by an X-Rite® densitometer on the tested area was recorded and compared to the optical density before testing. Dry rub resistance is defined as the percentage of optical density (OD) retained after testing. 100% density retained indicates no damage or loss or optical density on the imaged area. The results are listed in Table 3 below.

TABLE 3

| Ink No. | Polymer in Ink | Optical density at the right side of printed image | Optical density at the left side of printed image | Jetting nonuniformity | Dry Durability (% density retained) | Wet Durability (% density retained) |
|---|---|---|---|---|---|---|
| C-1 | None | 2.23 | 2.25 | 0.02 | 67.7% | 58.4% |
| C-2 | P1-DMEA | 1.83 | 0.07 | 1.76 | 98.4% | 102.4% |
| C-3 | P1-TEA | 1.66 | 0.06 | 1.60 | 88.5% | 101.8% |
| C-4 | P1-TELA | 1.64 | 0.05 | 1.59 | 103.5% | 106.9% |
| C-5 | P1-DELA | 1.48 | 0.06 | 1.42 | 99.5% | 106.7% |
| C-6 | P1-EM | 1.54 | 0.05 | 1.49 | 99.0% | 95.5% |
| C-7 | P1-NH4OH | 2.04 | 1.71 | 0.33 | 97.2% | 99.1% |
| I-1 | P1-KOH | 1.98 | 2.00 | 0.02 | 98.0% | 102.5% |
| I-2 | P1-NaOH | 1.88 | 1.92 | 0.04 | 100.0% | 99.5% |
| I-3 | P1-LiOH | 1.93 | 1.95 | 0.02 | 94.9% | 100.0% |
| C-8 | P2 | 1.72 | 0.07 | 1.65 | 98.9% | 98.6% |
| I-4 | P2-KOH | 1.89 | 1.74 | 0.15 | 99.0% | 102.1% |

In Table 2, a pigmented ink formulated without any polymer, such as C-1, had very good jetting uniformity, as shown by the very small difference in optical density when printing across a page. However, the image does not possess durability to common handling, as indicated by the low % density retained after durability test.

The durability of a print can be easily improved by the addition of polymer in ink, also shown in Table 2. However, jetting (non)uniformity varied depending on the base used to neutralize the addition polymer. The above results show that ink jet inks containing addition polymer that is neutralized with KOH, NaOH or LiOH in accordance with the invention printed on porous glossy receiver not only had good jetting uniformity (or low jetting non-uniformity), but also had improved dry and wet rub resistance.

Example 2
Magenta Pigment Dispersion 2 (MD-2)

A self-dispersed pigment red 122 dispersion prepared by surface modification technology through diazonium reaction was obtained from Cabot Corporation. The sample identification by Cabot was IJX-266, at 10.2% solids.

Ink Preparation

Inks were prepared as described in Example 1, except using surface modified pigment dispersion MD-2.

The pigment and addition polymers used in the inks employed in this invention and the comparison inks are given in the following Table 4:

TABLE 4

| Ink | Polymer Dispersion |
|---|---|
| C-9 (Control) | None |
| C-10 (Control) | P1-DMEA |
| C-11 (Control) | P1-TEA |
| I-5 | P1-KOH |
| I-6 | P1-NaOH |

These inks were printed and images were evaluated identical to those described in Example 1. The results are listed in Table 5 below.

TABLE 5

| Ink No. | Polymer in Ink | Optical density at the right side of printed image | Optical density at the left side of printed image | Jetting nonuniformity | Dry Durability (% density retained) | Wet Durability (% density retained) |
|---|---|---|---|---|---|---|
| C-9 | None | 1.36 | 1.59 | 0.23 | 59.6% | 33.8% |
| C-10 | P1-DMEA | 1.21 | 0.07 | −1.14 | 70.4% | 52.0% |
| C-11 | P1-TEA | 1.08 | 0.12 | −0.96 | 102.6% | 79.3% |
| I-5 | P1-KOH | 1.66 | 1.72 | 0.06 | 103.6% | 68.7% |
| I-6 | P1-NaOH | 1.63 | 1.65 | 0.02 | 68.9% | 45.7% |

In Table 5, a pigmented ink formulated without polymer, such as C-9, had good jetting uniformity, as shown by the small difference in optical density when printing across a page. However, the image does not possess durability to common handling, as indicated by the low % density retained after the durability test.

The durability of a print can be easily improved by the addition of polymer in the ink. However, jetting (non) uniformity varied depending on the base used to neutralize the addition polymer. The above results show that ink jet inks I-5 and I-6, containing addition polymer that is neutralized with KOH and NaOH in accordance with the invention, when printed on a porous glossy receiver, not only had good jetting uniformity (or low jetting non-uniformity), but also had improved dry and wet rub resistance.

The invention has been described in detail with particular reference to certain preferred embodiments thereof, but it will be understood that variations and modifications can be effected within the spirit and scope of the invention.

What is claimed is:

1. An ink jet ink composition comprising:
   from 40.0 to 99.0% by weight of water; from 0.1 to 20.0% by weight of a pigment dispersed with an oleoyl methyl taurine salt dispersant;
   from 0 to 70.0% by weight of a water miscible co-solvent; and
   from 0.1 to 20.0% by weight of a water-reducible addition polymer;
   wherein the weight average molecular weight of the polymer is from 2,000 to 100,000; the acid number is from 50 to 400; and the acid group on the polymer is neutralized by alkaline metal hydroxide; and wherein all weight percentages are based on the total weight of the ink composition.

2. The ink jet ink composition of claim 1 wherein the addition polymer comprises monomers selected from the group consisting of allyl compounds, allyl esters, vinyl ethers, vinyl esters, vinyl heterocyclic compounds, styrene or a styrene derivative, olefins and halogenated olefins, itconic acid and esters, crotonic acid and esters, unsaturated nitrites, acrylic acid or methacrylic acid and esters, vinyl alcohols, acrylamides and methacrylamides, vinyl ketones, and multifunctional monomers.

3. The ink jet ink composition of claim 2 wherein the addition polymer comprises monomers selected from the group consisting of vinyl ethers, styrene and styrene derivatives, olefins and halogenated olefins, itconic acid and esters and acrylic acid and methacrylic acid and esters.

4. The ink jet ink composition of claim 1 wherein 75 to 100% of the acid groups on the polymer is neutralized by alkaline metal hydroxide.

5. The ink jet ink composition of claim 4 wherein the alkaline metal hydroxide is lithium hydroxide, sodium hydroxide or potassium hydroxide, or a mixture thereof.

6. The composition of claim 1 wherein the water miscible co-solvent is from 1.0 to 50.0% by weight of the entire ink composition.

7. The composition of claim 1 wherein the water miscible co-solvent is from 5–40% by weight of the entire ink composition.

8. The composition of claim 1 wherein the pigment is from 0.2 to 15.0% by weight of the entire ink composition.

9. The composition of claim 1 wherein the addition polymer is from 0.2 to 15.0% by weight of the entire ink composition.

10. The composition of claim 1 wherein the addition polymer has a Tg of −40 to 200 degrees C.

11. The composition of claim 1 wherein the addition polymer has a Tg of 20 to 180 degrees C.

12. The composition of claim 1 wherein the addition polymer has a molecular weight of 4,000 to 40,000.

13. The composition of claim 1 wherein the addition polymer has a calculated acid number of 100 to 300.

14. The composition of claim 1 wherein at least 50% by weight of the pigment comprise particles having a particle size equal to or smaller than 200 nm.

15. The composition of claim 1 wherein at least 50% by weight of the pigment comprise particles having a particle size equal to or smaller than 100 nm.

16. The composition of claim 1 wherein the weight ratio of pigment to addition polymer is from 1:0.05 to 1:10.

17. The composition of claim 1 wherein the weight ratio of pigment to addition polymer is from 1:0.1 to 1:5.

18. The composition of claim 1 wherein the pigment is C.I. Pigment Blue 15:3, C.I. Pigment Red 122, C.I. Pigment Yellow 155, C.I. Pigment Yellow 74, bis(phthalocyanylalumino)tetraphenyldisiloxane or C.I. Pigment Black 7.

19. The ink jet ink composition of claim 1 wherein said oleoyl methyl taurine salt is the potassium salt.

20. An ink jet printing method, comprising the steps of:
   A) providing an ink jet printer that is responsive to digital data signals;
   B) loading said printer with an ink comprising: from 40.0 to 99.0% by weight of water; from 0.1 to 20.0% by weight of a pigment dipersed with an oleoyl methyl taurine salt dispersant; from 0 to 70.0% by weight of a water miscible co-solvent; and from 0.1 to 20.0% by weight of a water-reducible addition polymer; wherein the weight average molecular weight of the polymer is from 2,000 to 100,000; the acid number is from 50 to 400; and the acid group on the polymer is neutralized by alkaline metal hydroxide; and wherein all weight percentages are based on the total weight of the ink composition;
   C) loading said printer with an ink-receiving element comprising a support having thereon an ink-receiving layer; and
   D) printing on said ink-receiving layer using said ink jet ink in response to said digital data signals.

21. The method of claim 20 wherein the ink-receiving element comprises a support having thereon a continuous, coextensive, porous ink-receiving layer having interconnecting voids.

22. The method of claim 21 wherein the porous ink-receiving layer comprises from about 20% to about 100% of water-dispersible polymer particles and from about 0% to about 80% of a polymeric binder.

23. The method of claim 22 wherein said particles comprise silica, alumina, titanium dioxide, clay, calcium carbonate, barium sulfate or zinc oxide.

24. The method of claim 22 wherein said polymeric binder is poly(vinyl alcohol), hydroxypropyl cellulose, hydroxypropyl methyl cellulose, a poly(alkylene oxide), poly(vinyl pyrrolidinone), poly(vinyl acetate) or copolymers thereof, or gelatin.

25. The method of claim 21 wherein the porous ink-receiving layer comprises from about 50% to about 95% of water-dispersible polymer particles and from about 50% to about 5% of a polymeric binder.

26. The method of claim 21 wherein said porous ink-receiving layer contains organic particles.

27. The method of claim 20 wherein said continuous, coextensive, porous ink-receiving layer having interconnecting voids comprises a polymeric open-pore membrane.

28. The method of claim 21 wherein the alkaline metal hydroxide is lithium hydroxide, sodium hydroxide, potassium hydroxide, or a mixture thereof.

29. The method of claim 20 wherein at least 50% by weight of the pigment comprise particles having a particle size equal to or smaller than 200 nm.

30. The ink jet printing method of claim 20 wherein said oleoyl methyl taurine salt is the potassium salt.

* * * * *